United States Patent [19]

Yuguchi et al.

[11] Patent Number: 4,501,763

[45] Date of Patent: Feb. 26, 1985

[54] PROCESS FOR PREPARING A SARCOCARP-CONTAINING JELLY

[75] Inventors: Hiroya Yuguchi, Tokyo; Yoshinobu Hayashi; Yusuke Miyazaki, both of Kanagawa, all of Japan

[73] Assignee: Morinaga Milk Industry Co., Ltd., Tokyo, Japan

[21] Appl. No.: 524,740

[22] Filed: Aug. 19, 1983

[30] Foreign Application Priority Data

Aug. 24, 1982 [JP] Japan .................................. 57-145500

[51] Int. Cl.$^3$ ................................................ A23L 1/06
[52] U.S. Cl. ..................................... 426/573; 426/575; 426/576; 426/577
[58] Field of Search ................. 426/573, 577, 575, 576

[56] References Cited

U.S. PATENT DOCUMENTS

| 3,023,108 | 2/1962 | Anderson et al. | 426/577 |
|---|---|---|---|
| 3,326,694 | 6/1967 | Skelskie | 426/577 |
| 3,367,784 | 2/1968 | Waitman | 426/577 |

FOREIGN PATENT DOCUMENTS

| 0127962 | 10/1980 | Japan | 426/577 |
|---|---|---|---|
| 2078082 | 1/1982 | United Kingdom | 426/577 |

Primary Examiner—Jeanette M. Hunter
Attorney, Agent, or Firm—Oblon, Fisher, Spivak, McClelland & Maier

[57] ABSTRACT

A process for preparing a sarcocarp containing jelly having homogeneously dispersed sarcocarps by (a) dissolving starting materials for the manufacture of a jelly, other than gelling agents and sarcocarps, in water to prepare a syrup; (b) preparing an isotonized mixture (B) comprising isotonized sarcocarps and the syrup, by adding sarcocarps to the syrup to form a mixture (B) and heating the mixture (B) to pasteurize said mixture; (c) preparing a solution (A), with a specific gravity and in an amount necessary for the preparation of a liquid portion having a specific gravity substantially equal to that of the isotonized sarcocarps contained in the isotonized mixture (B), of a compounded mixture prepared by mixing the solution (A) with the isotonized mixture (B), wherein said solution (A) is prepared by heating an aqueous solution of starting materials containing gelling agents but not acidic constituents or the sarcocarps, and wherein the aqueous solution of starting materials has approximately a neutral pH for pasteurization; and (d) mixing the solution (A) with the isotonized mixture (B) at a temperature of not lower than the gelling temperature of the compounded mixture of the solution (A) and the isotonized mixture (B), and rapidly cooling the compounded mixture to solidify said mixture before reisotonizing the sarcocarps contained therein to the osmotic pressure of the liquid portion of the compounded mixture.

14 Claims, 2 Drawing Figures

PROCESS FOR PREPARING A SARCOCARP-CONTAINING JELLY

BACKGROUND OF THE INVENTION

1. Field of the Invention

The present invention relates to a process for preparing a sarcocarp (flesh of fruit)-containing jelly, and more particularly, it relates to a process for preparing a sarcocarp-containing jelly including homogeneously dispersed sarcocarps and having natural flavor and the taste of fruit. In particular, it has the taste of fruit without loss of a jelly texture in the mouth.

2. Description of the Prior Art

Recently, the needs of consumers with respect to desserts distributed at a temperature lower than 10° C., hereinafter referred to as "chilled desserts", have been diversified and directed to a higher quality. Even in jelly products, a novel product in which fruit juice contents are increased or a sarcocarp is added in order to use natural materials, a so-called fruit jelly, has been developed and put on the market.

However, there are specific technical problems in the manufacture of the fruit jelly, particularly a sarcocarp-containing jelly, such as how the sarcocarps may be homogeneously dispersed (or distributed) in the jelly. Consequently, in the conventional process, there are several difficulties in the manufacture, and shortcomings in the quality, of the fruit jelly which are as follows.

When starting materials for the manufacture of the jelly (hereinafter referred to as "starting materials" for abbreviation) containing sarcocarps, sugars, gelling agents and other ingredients are added to water, and the mixture is heated to be pasteurized and rapidly cooled to be solidified, the osmotic pressure of the sarcocarps in the above mixture reaches a level equal to that of the liquid portion of the above mixture. However, since the specific gravity of the isotonized sarcocarps is greater than that of the liquid portion of the above mixture, the isotonized sarcocarps precipitate before solidification of the above mixture at the stage of cooling. Therefore, it is impossible to manufacture a jelly in which the sarcocarps are homogeneously dispersed.

In the conventional process, starting materials, such as sugars, acidic constituents, coloring agents and flavoring materials, are dissolved in water, and the sarcocarps are mixed therewith. Then to the resulting mixture containing the sarcocarps are added about 0.5 to 1.0% by weight (hereinafter referred to as "%" for abbreviation) of thickening agents such as locust bean gum and guar gum and about 0.2 to 2.0% of gelling agents such as carrageenan, agar agar, gelatin and pectin. The resulting mixture is heated to prepared a highly viscous mixture. The highly viscous mixture is then stirred and poured into a container whereby the floating or precipitating speed of the sarcocarps in the container is extremely decreased or floatation or precipitation of the sarcocarps in the container is substantially ceased. Then the highly viscous mixture in the container is cooled to be solidified, whereby the sarcocarps are homogeneously dispersed in the jelly.

However, due to the use of a comparatively large amount of thickening agents in the above conventional process, a rubber-like elastic body and markedly pasty texture are given to the fruit jelly. The above body and texture of the fruit jelly obtained by the conventional process are fatal defects for the use of the jelly as a commodity. Furthermore, because of the simultaneous use of thickening agents and gelling agents, the gelation temperature of the gelling agents rises markedly by the synergistic effect of both agents, in comparison with that caused by separate use of the gelling agents. Therefore, the addition of the highly viscous mixture to the container is carried out at a higher temperature. Several disadvantages in the quality of the fruit jelly such as decreased gelling ability of the gelling agents, cause a marked increase of syneresis and disappearance of flavor.

In order to improve the above conventional process having such disadvantages, an attempt was made in which the high viscosity required for homogeneous dispersion of the sarcocarps in the fruit jelly was attained without the use of large amounts of a thickening agent. In this attempt, starting materials with or without the sarcocarps were added to water, heated to pasteurize the mixture, cooled to a temperature somewhat higher than gel-forming temperature (i.e. the highest temperature at which gelation of the mixture containing gelling agent is initiated) of the gelling agent used (for example, gel-forming temperature ±2° C. to 3° C.), and poured into a container which continuous stirring to give a shearing stress which maintains the high viscosity of the mixture and homogeneous dispersion of the sarcocarps in the mixture.

In this process, however, rapid gelation occurs as soon as the shearing stress is removed and, therefore, it is necessary that the filling of containers be carried out under continuous stirring or, at least, a shearing stress is continuously applied thereto immediately before the filling. Consequently, it is essential to use a special filling apparatus in which a shearing stress is continuously applied. It is also necessary that the temperature prior to the filling step be maintained in the above-mentioned temperature range. Thus, there is a large restriction imposed upon the manufacture of the product.

As an improvement in the above process, another process is known wherein control of the temperature near gel-forming temperature is not required. In this process, gelling agents are used which react with specific metal ions such as calcium ion to form a reversible gel such that the gel destroyed by applying the shearing stress is restored to the original gel by removing the shearing stress. Once a mixture containing this gelling agent is solidified, a shearing stress is applied thereto to maintain the required high viscosity, while the temperature of the resulting viscous mixture is maintained at a temperature below the gel-forming temperature, then added to a container such that the sarcocarps are homogeneously dispersed. The product is manufactured by utilizing the above mentioned reversibility of the gel. In this process, however, when the excess shearing stress is applied to the gel, even a gelling agent having gel reversibility loses its gelation ability and a long time is required for regelation. Therefore, it is a disadvantage that the amount of the gelling agent used must be increased. Also, there is a restriction in the gelling agent used so that those agents having the texture of jelly in the mouth cannot be always selected for use. Accordingly, this process is not always satisfactory in terms of the quality of the products obtained.

Furthermore, the pH of the mixture prepared for the manufacture of the fruit jelly is low regardless of the presence or absence of the sarcocarp and, when it is heated for pasteurization without any pretreatment, the gelling agents are hydrolyzed and therefore, the use of somewhat larger amount of gelling agents will be required. This generally produces an undesirable effect in terms of taste. This is known to be one of the improvements needed in the manufacture of pasteurized fruit jelly.

Therefore, a need continues to exist for a jelly in which the sarcocarps are homogeneously dispersed and which has the inherent taste and flavor of natural materials without the loss of a jelly texture in the mouth.

SUMMARY OF THE INVENTION

Accordingly, it is an object of the present invention to provide a process for the preparation of a sarcocarp-containing jelly having homogeneously dispersed sarcocarps.

It is also an object of this invention to provide a process for the preparation of a sarcocarp-containing jelly having an excellent texture in the mouth.

Moreover, it is also an object of the present invention to provide a process for the preparation of a sarcocarp-containing jelly having the inherent taste and flavor of natural materials.

Further, it is also an object of this invention to provide a sarcocarp-containing jelly which has all of the aforementioned qualities and characteristics.

According to the present invention, the foregoing and other objects are attained by providing a process for preparing a jelly having homogeneously dispersed sarcocarps which comprises the steps of: (a) dissolving starting materials for the manufacture of a jelly, other than gelling agents and sarcocarps, in water to prepare a syrup; (b) preparing an isotonized mixture (B) comprising isotonized sarcocarps and the syrup by adding sarcocarps to the syrup to form a mixture (B) and heating the mixture (B) to pasteurize said mixture; (c) preparing a solution (A), having a specific gravity substantially equal to that of the isotonized sarcocarps contained in the isotonized mixture (B), of a compounded mixture prepared by mixing the solution (A) with the isotonized mixture (B), wherein said solution (A) is prepared by heating an aqueous solution of starting materials containing gelling agents but not containing acidic constituents or the sarcocarps, and wherein the aqueous solution of starting materials has approximately a neutral pH for pasteurization; and (d) mixing the solution (A) with the isotonized mixture (B) at a temperature of not lower than the gelling temperature of the compounded mixture of the solution (A) and the isotonized mixture (B), and rapidly cooling the compounded mixture to solidify said mixture before reisotonizing the sarcocarps contained therein to the osmotic pressure of the liquid portion of the compounded mixture.

BRIEF DESCRIPTION OF THE DRAWINGS

Other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
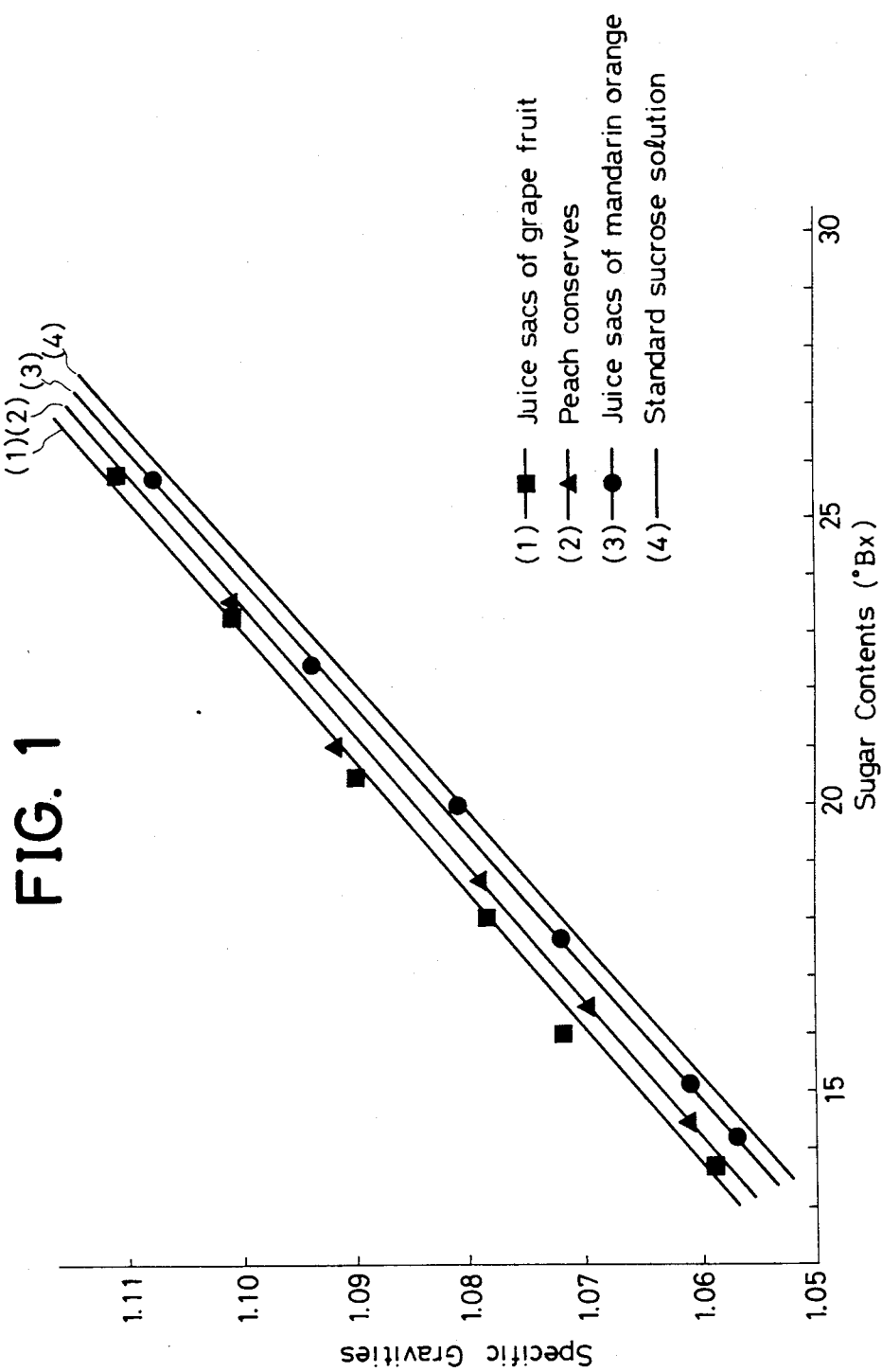
FIG. 1 shows the relationship between the specific gravities and the sugar contents (°Bx) at 20° C. in three kinds of sarcocarps and a standard sucrose solution.

In accordance with the present invention, the starting materials other than gelling agents and sarcocarps (that is, sugars, fruit juices, edible organic acids, flavoring materials and coloring agents) are dissolved in water to prepare a syrup, and then the sarcocarps are added to the syrup to form a mixture (B), which is then pasteurized, and an isotonized mixture (B) is prepared. During pasteurization, the sugar content of the sarcocarps results in a level approximately equal to that of the syrup by an osmotic pressure and isotonized sarcocarps are thereby obtained. The isotonized mixture (B) generally contains 30 to 50% of the sarcocarps, 30 to 50% of fruit juices, 0.5 to 6% of edible organic acids, 2 to 20% of sugars and a suitable amount of flavoring materials and coloring agents.

In the present specification, the liquid portion of the isotonized mixture (B) is sometimes referred to as "an isotonized syrup", the sarcocarps contained in the isotonized mixture (B) is sometimes referred to as "an isotonized sarcocarp", and the mixture prepared by mixing the solution (A) with the isotonized mixture (B) without reisotonizing is referred to as "a compounded mixture", respectively.

Separately, the starting materials excepting the sarcocarps and acidic constituents (i.e. fruit juices and edible organic acids) are dissolved in water to prepare a solution (A), a specific gravity of which is controlled by regulating the amount of sugars to be added thereto, such that when the solution (A) is mixed with the isotonized mixture (B) to prepare a compounded mixture, the specific gravity of the liquid portion of the compounded mixture will be equal to that of the sarcocarp portion (the specific gravity of which is equal to that of isotonized sarcocarps) of the compounded mixture. The starting materials such as sucrose and maltitol which are hydrolyzed by heating in the presence of acidic constituents are preferably used in preparation of the solution (A).

In the preparation of the solution (A), it is possible to use thickening agents in an amount sufficient to maintain a good jelly texture in the mouth, for instance, 0.4% or lower (preferably 0.2% or lower). Usually, the gelling agents are added to water, and heated so that the gelling agents are dissolved therein, then sugars are added thereto, and the resulting solution is heated to effect pasteurization to give the solution (A). When flavoring materials, coloring agents and thickening agents are used, it is preferred to use them together with sugars. The amount of the gelling agents used differs depending upon the type used and, usually, it is 0.2 to 0.8% based on the amount of the solution (A). The amount of sugars is such that the sugar content in the solution (A) reaches 10 to 30% Bx, preferably 15° to 25°Bx. In the preparation of the solution (A), the solution containing gelling agents is heated, and since many gelling agents are hydrolyzed in the acidic range of pH, care must be taken in order to maintain the pH approximately neutral throughout the preparation of the solution (A).

The specific gravity of the solution (A) is adjusted by changing the added amount of sugars so that when amounts of the solution (A) and a liquid protion of the isotonized mixture (B) have been predetermined, the specific gravity of the liquid portion of the compounded mixture (B) become the same value. In the present invention, a sarcocarp-containing jelly in which sarcocarps are homogeneously dispersed may be obtained by adjusting the specific gravity and the amount of the solution (A).

The solution (A) and the isotonized mixture (B) are separately cooled to adequate temperatures, for example, to around 20° C. for the isotonized mixture (B) and 50° to 80° C. for the solution (A) and these are well mixed at a temperature which is not lower than the gelation temperature of the gelling agents used to pepare a compounded mixture. The resulting compounded mixture is immediately poured into a container and cooled as rapidly as possible to be solidified, thereby yielding sarcocarp-containing jelly products.

Since the sarcocarps and the liquid portion of the compounded mixture have substantially equal specific gravities, the sarcocarps homogeneously dispersed in the liquid portion of the compounded mixture never precipitate, even when allowed to stand, but remain homogeneously dispersed. However, since the sugar contents of the each are different, their sugar contents become equal due to an isotonic phenomenon as time progresses and, at the same time, their specific gravities change. Therefore, in the present invention, the process of preparing the compounded mixture, from cooling to solidification, is to be conducted as promptly as possible. Moreover, the compounded mixture should not be heated because the isotonic phenomenon is accelerated by heating.

Adjustment of the specific gravity and the amount of the above solution (A) can be obtained experimentally or, as will be illustrated hereafter, can be calculated from equations.

Pasteurization of solution (A) and the mixture (B) by heating, according to the present invention is usually carried out in the range between 75° C. for 15 minutes and 140° C. for 2 seconds. As to the means for pasteurization by heating, use of a tank equipped with a steam jacket, or an HTST method using a plate heater, or a UHT method using a plate heater with superheated steam or any other conventional means is acceptable.

Examples of sugars applicable are sucrose, glucose, fructose, maltitol, sorbitol and other sweeteners. Among them, sucrose and maltitol are hydrolyzed when heated with an acidic constituent and, therefore, they are preferably to be used in preparing the solution (A).

Gelling agents applicable are, for example, carrageenan, gelatin, agar agar, pectin or any other substances which dissolve on heating, gel on cooling and are usable in the manufacture of foods. However, in the manufacture of fruit jellies, particularly a sarcocarp-containing fruit jelly, it is desirable to use carrageenan because the products have an excellent texture in the mouth with an adequate elasticity and without a pasty texture.

As to fruit juices, juices of any kind of fruit may be used. With reference to the states of the juice, unconcentrated juice, concentrated juice or puree may be used.

Examples of edible organic acids applicable are citric acid, malic acid, tartaric acid, fumaric acid, or salts thereof, and other organic acids which can be used in the manufacture of foods.

As to sarcocarps, juice sac (vesicle) of citrus fruits such as Unshumikan (a kind of Citrus Aurantium subsp. nobilis; mandarin orange), Citrus Aurantium var. sinensis and grapefruits, pieces in suitable sizes (for instance, 5 to 10 $mm^3$) of sarcocarps of peach, pineapple and apricot, and their preserved products in a sugar solution may be used. It is preferred to use preserved products of which the sugar content of the syrup used is preferably within the range of 10° to 30°Bx.

An essential aspect of the present invention for the preparation of the sarcocarp-containing jelly having homogeneously dispersed sarcocarps is that, as already described hereinabove, the specific gravity of the liquid portion of the compounded mixture is adjusted to a level about equal to that of the sarcocarps in the compounded mixture. According to the present invention, the above adjustment of the specific gravities can be carried out without any addition to or any change in the conventional manufacturing steps, and it can be also carried out in various sarcocarps having different characteristics and physico-chemical properties.

The present inventors have examined the relationship between specific gravities and sugar contents in various kinds of sarcocarps as illustrated hereinafter, and have found that (i) there is a linear relation between specific gravities and sugar contents of the isotonized sarcocarps within a range of 10° to 30°Bx in sugar contents, and (ii) the difference between the specific gravities of the sarcocarps and that of the syrup is constant as long as sugar contents are within the above range. By utilizing such relations, the present inventors have succeeded in making the specific gravity of the liquid portion of the compounded mixture approximately equal to that of the sarcocarps therein.

When sarcocarps are heated in a syrup of a definite sugar content, the sarcocarps and the syrup are generally isotonized, and the sugar contents of the sarcocarps reach a level approximately equal to that of the syrup. Thus, the isotonized sarcocarps with various sugar contents are prepared by heating the sarcocarps in the syrup of various sugar contents.

Starting sarcocarps, which were juice sacs of mandarin orange (Unshumikan) which had been preserved in a syrup (sugar content of the syrup: 11°Bx) and separated, were mixed with seven kinds of a syrup as shown in Table 1 in a ratio as given in the same table to give the mixture (B). Then they were heated to be pasteurized at 85° C. for 10 minutes, and cooled to 20° C. immediately thereafter to give an isotonized mixture (B) with sugar contents as given in the same table.

Even when the heating time was more prolonged than that mentioned above, there was no more change in the sugar contents of the sarcocarps and the liquid portion of the isotonized mixture (B) which meant that the isotonization was already achieved.

Specific gravities of seven kinds of the isotonized sarcocarps were determined as follows. Each 10 ml of twenty one standard sucrose solutions, which covered the range of sugar content 10° to 30°Bx and was prepared at unit intervals (1°Bx), was placed in twenty one test tubes, and an appropriate amount of seven kinds of the isotonized sarcocarps (juice sacs) were added thereto. By observing whether the juice sacs floated or precipitated, the sucrose solution having a specific gravity identical to that of the juice sacs was identified and, from its sucrose concentration, the specific gravity of the juice sacs was measured. The results are shown in Table 1.

TABLE 1

| Composition of the mixture (B) | 1 | 2 | 3 | 4 | 5 | 6 | 7 |
| --- | --- | --- | --- | --- | --- | --- | --- |
| (Sarcocarps) | | | | | | | |
| Juice sacs of the mandarin orange in sugar solution (g) | 73 | 73 | 73 | 73 | 73 | 73 | 73 |
| (Syrup) | | | | | | | |
| 5-fold juice of mandarin orange (g) | 8 | 8 | 8 | 8 | 8 | 8 | 8 |
| 5-fold juice of C. Aurantium var. sinensis (g) | 2 | 2 | 2 | 2 | 2 | 2 | 2 |
| Citric acid (g) | 0.7 | 0.7 | 0.7 | 0.7 | 0.7 | 0.7 | 0.7 |
| Sodium citrate (g) | 0.3 | 0.3 | 0.3 | 0.3 | 0.3 | 0.3 | 0.3 |
| Sucrose (g) | 0 | 1 | 3.5 | 6 | 8.5 | 11 | 13.5 |
| Water (g) | 16 | 15 | 12.5 | 10 | 7.5 | 5.0 | 2.5 |
| The isotonized sarcocarps (Juice sacs of the mandarin orange) | | | | | | | |
| Sugar contents (°Bx) | 14.2 | 15.1 | 17.7 | 20.0 | 22.4 | 25.7 | 28.4 |
| Specific gravity | 1.057 | 1.061 | 1.072 | 1.081 | 1.094 | 1.108 | 1.115 |

Also, similar experiments were conducted using the following as sarcocarps.

(a) Commercially available juice sacs of grapefruit (sugar content: 11°Bx) which were treated by the same manner as the above-mentioned juice sacs of mandarin orange.

(b) Peach conserves (sugar content: 20°Bx) which were prepared by dipping cut sarcocarps (about 5 mm³) of yellow peach (Prunus persica Batsch var. vulgaris Maxim. which has yellow-colored sarcocarp) in sugar solution.

Sugar contents and specific gravities of the isotonized sarcocarps were calculated therefrom. The results are shown in Table 2.

In these experiments, it was found that, by heating in the range of 75° C. for 15 minutes to 140° C. for 2 seconds, which is a condition sufficient to pasteurize the sarcocarp, an isotonization is observed in all cases and that additional means for isotonization are not necessary.

TABLE 2

| | Isotonized grapefruit (a) | | Isotonized peach (b) | |
| --- | --- | --- | --- | --- |
| | Sugar contents (°Bx) | Specific gravity | Sugar contents (°Bx) | Specific gravity |
| 1 | 13.1 | 1.055 | 12.8 | 1.055 |
| 2 | 13.7 | 1.059 | 14.5 | 1.061 |
| 3 | 16.0 | 1.072 | 16.5 | 1.070 |
| 4 | 18.0 | 1.079 | 18.7 | 1.079 |
| 5 | 20.5 | 1.090 | 21.0 | 1.092 |
| 6 | 23.3 | 1.101 | 23.5 | 1.101 |
| 7 | 25.8 | 1.111 | 26.0 | 1.115 |

In FIG. 1, the relation is illustrated between the specific gravity and the sugar content (°Bx) in accordance with the results of the above experiments as shown in Table 1 and Table 2. In the figure, a longitudinal axis and a transverse axis show the specific gravity and the sugar content (°Bx) respectively, and —●— in (3), —■— in (1), —+— in (2) and —in (4) show results for juice sacs of the mandarin orange, juice sacs of the grape fruit, the peach and the standard sucrose solution, respectively.

From those results, it was observed that though specific gravities of isotonized sarcocarps having equal levels of sugar content differ for the kinds of sarcocarps used, all of them are higher than that of the standard sucrose solution. This is due to the presence of fibrous, and other types of matter in isotonized sarcocarps, and it is, therefore, unavoidable that the specific gravities vary depending upon the kind, quality and degree of ripening of the sarcocarp used.

In FIG. 1, however, the relationship between sugar contents of the syrups and specific gravities of the sarcocarps with a range of 10° to 30°Bx can be seen to be approximately linear. They are also approximately parallel to that of the standard sucrose solution. Consequently, if specific gravities and sugar contents of the standard sucrose solution and of the sarcocarp within the above range are given as $\rho_s$, $P_{os}$ and $\rho_f$ and $P_{of}$, respectively, the equations (1) and (2) are derived from the FIG. 1.

$$\rho_s = 4.4 \times 10^{-3} P_{os} + 0.993 \tag{1}$$

$$\rho_f = 4.4 \times 10^{-3} P_{of} + C \tag{2}$$

(wherein C is a value determined by the sarcocarp used.)

When the parameters of specific gravities, sugar contents and amounts used (in kilograms; also the same as hereinafter) of the sarcocarp and the isotonized sarcocarp thereof are expressed as terms $\rho_{f1}$, $P_{of1}$ and $W_{f1}$ as well as $\rho_{f2}$, $P_{of2}$ and $W_{f2}$, respectively, and further when the parameters of specific gravities, sugar contents and amounts used of the syrup and of the liquid portion of the mixture (B) were expressed as terms $\rho_{s1}$, $P_{os1}$ and $W_{s1}$ as well as $\rho_{s2}$, $P_{os2}$ and $W_{s2}$, respectively, the following equations (3) to (10) are derived provided that the change before and after the pasteurizing treatment by heating is taken into consideration.

Thus, equations (3) and (4) are obtained from a volume balance;

$$\frac{W_{f1}}{\rho_{f1}} = \frac{W_{f2}}{\rho_{f2}} \tag{3}$$

$$\frac{W_{s1}}{\rho_{s1}} = \frac{W_{s2}}{\rho_{s2}} \tag{4}$$

and, from a weight balance, equation (5) is obtained:

$$W_{f1} + W_{s1} = W_{f2} + W_{s2} \tag{5}$$

Then from equation (1), there are the relationships of equations (6) and (7):

$$\rho_{s1} = 4.4 \times 10^{-3} P_{os1} + 0.993 \tag{6}$$

$$\rho_{s2} = 4.4 \times 10^{-3} P_{os2} + 0.993 \tag{7}$$

and, from equation (2), there are the relationships of the equations (8) and (9):

$$\rho_{f1} = 4.4 \times 10^{-3} P_{of1} + C \quad (8)$$

$$\rho_{f2} = 4.4 \times 10^{-3} P_{of2} + C \quad (9)$$

In addition, isotonization gives rise to the following equation (10):

$$P_{os2} = P_{of2} \quad (10)$$

These equations are modified as given below to provide equation (15). Initially, equation (11) is derived from equations (8) and (9):

$$\rho_{f1} - \rho_{f2} = 4.4 \times 10^{-3}(P_{of1} - P_{of2})$$

$$P_{of2} = P_{of1} - \frac{\rho_{f1} - \rho_{f2}}{4.4 \times 10^{-3}} \quad (11)$$

and, from equations (7) and (10), equation (12) is obtained:

$$\rho_{s2} = 4.4 \times 10^{-3} \left( P_{of1} - \frac{\rho_{f1} - \rho_{f2}}{4.4 \times 10^{-3}} \right) + 0.993$$

$$\rho_{s2} = \rho_{f2} - \rho_{f1} + 4.4 \times 10^{-3} P_{of1} + 0.993 \quad (12)$$

Substitution of equation (12) for equation (4) gives equation (13):

$$W_{s2} = \frac{W_{s1}}{\rho_{s1}} (\rho_{f2} - \rho_{f1} + 4.4 \times 10^{-3} P_{of1} + 0.993) \quad (13)$$

and, since equation (14) is obtained from equation (3):

$$W_{f2} = \frac{\rho_{f2}}{\rho_{f1}} W_{f1} \quad (14)$$

substitution of equations (13) and (14) for equation (5) gives equation (14'):

$$W_{f1} + W_{s1} = \frac{\rho_{f2}}{\rho_{f1}} W_{f1} + \quad (14')$$

$$\frac{W_{s1}}{\rho_{s1}} (\rho_{f2} - \rho_{f1} + 4.4 \times 10^{-3} P_{of1} + 0.993)$$

$$W_{s1} \left\{ 1 - \frac{1}{\rho_{s1}} (\rho_{f2} - \rho_{f1} + 4.4 \times 10^{-3} P_{of1} + 0.993) \right\} =$$

$$W_{f1} \left( \frac{\rho_{f2}}{\rho_{f1}} - 1 \right)$$

In the above equations, $\rho_{f2}$ denotes the specific gravity of the isotonized sarcocarp and, in the present invention, it is the average specific gravity of the entire compounded mixture as well as that ($\rho$) of the liquid portion of the compounded mixture. Therefore, $\rho_{f2}$ will now be given as $\rho$ and, as a result of the rearrangement of equation (14'), the following equation (15) is obtained:

$$W_{s1} = \frac{W_{f1} \left( \frac{\rho}{\rho_{f1}} - 1 \right)}{1 - \frac{1}{\rho_{s1}} (\rho - \rho_{f1} + 4.4 \times 10^{-3} P_{of1} + 0.993)} \quad (15)$$

Figure 2:
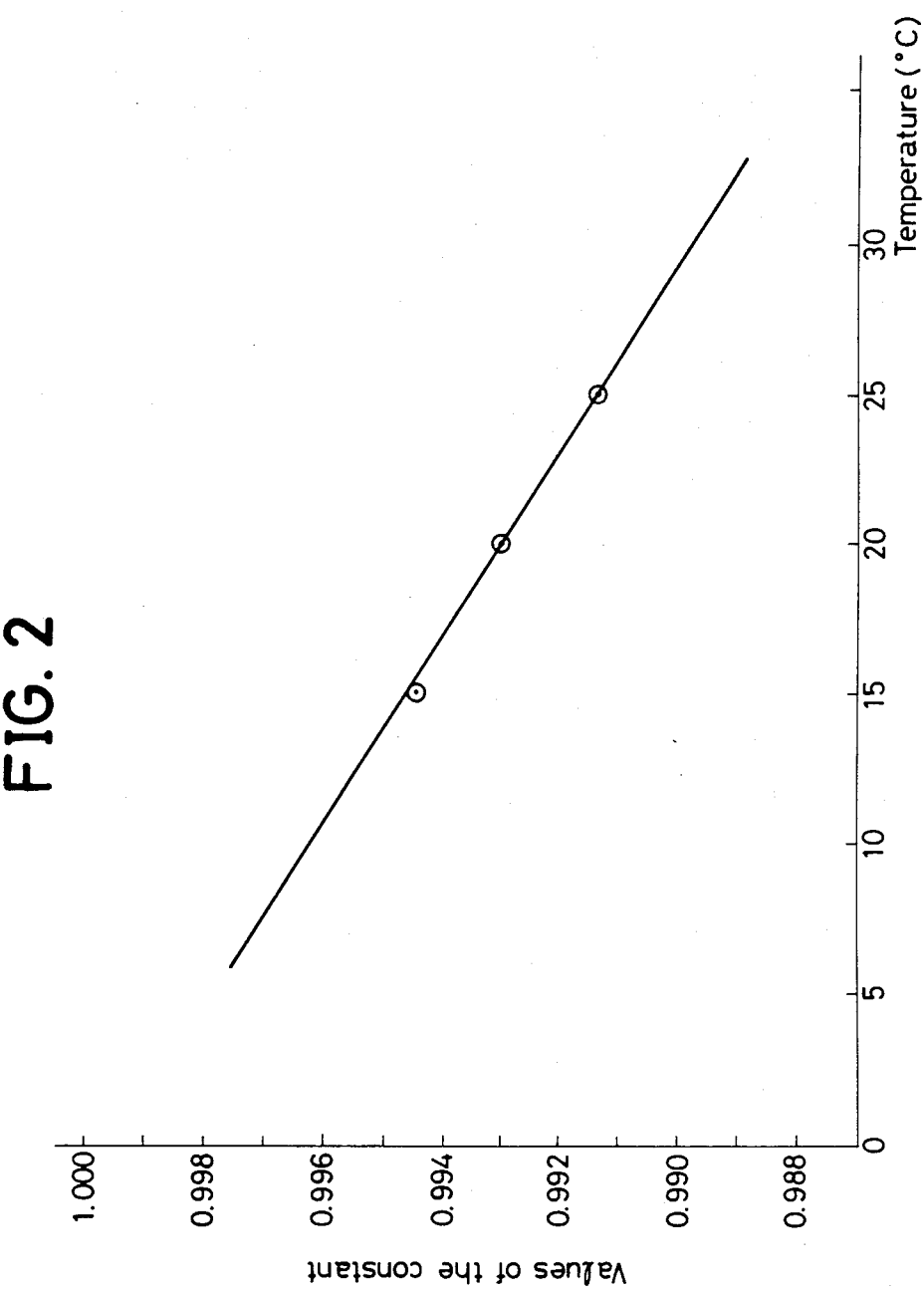
FIG. 2 shows the relationship between the constant term in the equation and temperature.

The above equations are derived for the case where the temperatures before and after the heating and cooling treatment of the mixture (B), i.e. the temperatures of the mixture (B), and the isotonized mixture (B) are 20° C., that is $\rho_{s1}$ and $\rho_{s2}$ are defined by equations (6) and (7), respectively. However, the value of the constants (0.993) in equations (6) and (7) varies somewhat depending upon the temperature and the results of such an effect are illustrated in FIG. 2. In the figure, a longitudinal axis and a transverse axis show the specific gravity and the temperature (°C.), respectively.

From FIG. 2, the value of the constant is given as $-3.2 \times 10^{-4} t + 0.994$ (wherein t stands for a temperature in Centigrade) and, accordingly, if the temperature of the mixture (B) before heating and after heating and cooling treatment is given as t (°C.), then the equation (15) will more generally be given as the equation (15'):

$$W_{s1} = \quad (15')$$

$$\frac{W_{f1} \left( \frac{\rho}{\rho_{f1}} - 1 \right)}{1 - \frac{1}{\rho_{s1}} (\rho - \rho_{f1} + 4.4 \times 10^{-3} P_{of1} - 3.2 \times 10^{-4} t + 0.9994)}$$

In most cases, however, the above temperature is preferably about 20° C. in terms of the easiness of the treating operations and, therefore, equation (15) is frequently used. In the following description, the above temperature is set at 20° C.

Thus, when equation (15) is used in the preparation of the isotonized mixture (B), it is possible to ascertain the relation between the specific gravities and the amounts of the syrup used by measuring the specific gravity, $\rho_{f1}$, the sugar content, $P_{of1}$, and the amount used, $W_{f1}$, of the sarcocarp followed by adjusting the average specific gravity ($\rho$) in the compounded mixture of the isotonized mixture (B) and the solution (A) to a desired value. In other words, it is acceptable to use the syrup with such a relationship.

Then the mixture (B) is prepared by adding the sarcocarp to the syrup in accordance with equation (15). The mixture is heated to be pasteurized under the above condition, and cooled to 20° C. to form the isotonized mixture (B).

The preparation of the compounded mixtue by mixing the above isotonized mixture (B) with the solution (A) will be hereinafter described.

Specific gravity, $\rho_{s2}$, and amount, $W_{s2}$, of the liquid portion of the isotonized mixture (B) can be expressed, from equations (12) and (4), as equations (16) and (17):

$$\rho_{s2} \times \rho - \rho_{f1} + 4.4 \times 10^{-3} P_{of1} + 0.993 \quad (16)$$

$$W_{s2} = \frac{W_{s1}}{\rho_{s1}} (\rho - \rho_{f1} + 4.4 \times 10^{-3} P_{of1} + 0.993) \quad (17)$$

The equations (16) and (17) are the equations for the condition of 20° C. and, when the above given constant value in FIG. 2 ($-3.2 \times 10^{-4}t + 0.9994$; wherein t stands for temperature) is substituted for the corresponding terms, $\rho_{s2}$ and $W_{s2}$ can be expressed by the following equations (16') and (17'):

$$\rho_{s2} = \rho - \rho_{f1} + 4.4 \times 10^{-3} P_{of1} - 3.2 \times 10^{-4}t + 0.9994 \quad (16')$$

$$W_{s2} = \frac{W_{s1}}{\rho_{s1}} (\rho - \rho_{f1} + 4.4 \times 10^{-3} P_{of1} - 3.2 \times 10^{-4}t + 0.9994) \quad (17')$$

Since the liquid portion of the compounded mixture is a mixture of the liquid portion of the isotonized mixture (B) and the solution (A), the following equation (18) is derived provided that the specific gravity and the amount of the solution (A) are given as $\rho_A$ and $W_A$:

$$\rho = \frac{W_{s2} + W_A}{\frac{W_{s2}}{\rho_{s2}} + \frac{W_A}{\rho_A}} \quad (18)$$

and it is acceptable to use $\rho_A$ and $W_A$ under such a relationship as solution (A). The mixing ratio of solution (A) and the isotonized mixture (B) is $W_A/(W_{f2}+W_{s2})$ and, usually, this value is within a range of 1.0 to 9.0.

The temperature immediately after the mixing is controlled to be 5° to 10° C. higher than the gel-forming temperature of the gelling agent. The mixing means may be continuous or in batch as long as the homogeneous state is attained.

Since the specific gravity of the isotonized sarcocarp becomes substantially equal to that of the liquid portion of the compounded mixture, the sarcocarps are easily dispersed, homogeneously, with a conventional mixer which is used for mixing of a blend having a medium degree of viscosity. In addition, the dispersed state of the sarcocarps is easily maintained, and stirring of the compounded mixture is not required until the filling step.

The compounded mixture is poured into transparent or non-transparent plastic containers and cooled to solidify, whereby the final products, (i.e. a sarcocarp-containing jelly) in which the sarcocarps are homogeneously dispersed, are prepared. The cooling speed is preferably as rapid as possible, in contrast to the cooling of the isotonized mixture (B), in order to effect solidification without reisotonizing the isotonized sarcocarps to the level of the liquid portion of the compounded mixture. Only one kind of sarcocarps is used for the preparation of the mixture (B) but it is also possible to prepare a jelly containing several kinds of sarcocarps by manufacturing several kinds of mixture (B) containing different kinds of sarcocarps, and then mixing them.

In accordance with the present invention, solution (A) and mixture (B) are prepared separately as mentioned above. Conventional pasteurization by heating is applied to the mixture (B) to adjust the specific gravity of the sarcocarps contained therein to prepare the isotonized mixture (B), while the solution (A) having neutral pH is prepared by dissolving gelling agents and sugars, but not acidic constituents, in water. Hence, it is possible to pasteurize by heating, without hydrolysis of the gelling agents, and also to conduct quantitative treatment while preparing solution (A) and the isotonized mixture (B) according to the kinds of sarcocarp used. Accordingly, it is now possible to solve the above-mentioned disadvantages in the conventional process, such as inferior jelly quality due to the use of large amounts of thickening agents and gelling agents as well as the necessity of using special filling and controlling apparatus. It is now possible to manufacture a sarcocarp-containing jelly having an excellent texture in the mouth with natural and fresh taste and flavor, and having homogeneously dispersed sarcocarps.

The present invention will be further illustrated by certain examples and references which are provided for purposes of illustration only and are not intended to limit the present invention.

EXAMPLE 1

73 kg of separated juice sacs (specific gravity: 1.090, sugar content: 22°Bx) of a mandarin orange (Unshumikan), which were preserved in a sucrose solution, and were commercially available, were used as a sarcocarp and, as materials for a syrup, the materials described in Table 3 were used. A sarcocarp-containing jelly, wherein the specific gravity of a liquid portion of the compounded mixture was 1.11, was prepared.

When 27 kg of the syrup was used, the specific gravity ($\rho_{s1}$) of the syrup was calculated from equation (15) by substituting $W_{s1}$, $W_{f1}$, $\rho_{f1}$ and $P_{of1}$ for 27, 73, 1.110, 1.090 and 22, respectively. Thus, a syrup having a specific gravity of 1.168 was to be prepared.

The specific gravity of the syrup was adjusted by changing the amount of mainly sucrose and water. The starting materials, excepting the sarcocarps shown in Table 3, were placed in a 200 liter tank with a jacket for heating or cooling, and were dissolved in water by heating at 40° C. to 50° C. to prepare the syrup. Then sarcocarps were added to the syrup and heated at 85° C. for 10 minutes to be pasteurized and were then cooled to 20° C. to prepare an isotonized mixture (B). The specific gravity of the liquid portion of the isotonized mixture (B) ($\rho_{s2}$) was calculated from equation (16) by substituting $\rho$, $f_1$ and $P_{of1}$ for 1.110, 1.090 and 22, respectively, through an actual measurement was, of course, possible.

The amount ($W_{s2}$) of the liquid portion of the isotonized mixture (B) was calculated from the equation (17) as follows:

$$W_{s2} = \frac{27}{1.168} (1.110 - 1.090 + 4.4 \times 10^{-3} \times 22 + 0.993)$$

$$= 27 \times \frac{1.1098}{1.168} = 25.65$$

The results are shown in Table 3.

TABLE 3

| Materials used. | Mixture (B) Amounts. (kg) | Mixture (B) Specific gravity. | Isotonized Mixture (B) Amounts. (kg) | Isotonized Mixture (B) Specific gravity. |
|---|---|---|---|---|
| (Sarcocarp) | | | | 1.110 |
| Juice sacs of the mandarin orange preserved in sugar solution. | 73 | 1.090 | | |
| (Syrup) | | 1.168[1] | 25.65[3] | 1.1098[2] |
| 5-fold juice of the mandarin orange | 8 | | | |
| 5-fold juice of Citrus Aurantium var. sinensis | 2 | | | |
| Sucrose | 4.7 | | | |
| Citric acid | 0.7 | | | |
| Sodium citrate | 0.3 | | | |
| Coloring agent | 0.1 | | | |

TABLE 3-continued

| Materials used. | Mixture (B) | | Isotonized Mixture (B) | |
|---|---|---|---|---|
| | Amounts. (kg) | Specific gravity. | Amounts. (kg) | Specific gravity. |
| Flavoring material | 0.5 | | | |
| Water | 10.7 | | | |
| Grand Total | 100 | | | |

[1] Calculated from equation (15)
[2] Calculated from equation (16)
[3] Calculated from equation (17)

Then, solution (A) was prepared by using the materials described in Table 4. When the amount of the isotonized mixture (B) to be mixed with solution (A) was 30%, according to the usual proportions of a sarcocarp-containing jelly, 233 kg (=70/0.3=$W_A$) of solution (A) was to be prepared.

The specific gravity ($\rho_A$=1.1100) of the solution (A) was calculated from equation (18) as follows:

$$1.11 = \frac{25.65 + 233}{\frac{25.65}{1.1098} + \frac{233}{\rho_A}}$$

Since the specific gravity of solution (A) was mainly adjusted by the content of sucrose, specified amounts of materials as shown in Table 4 were used to prepare solution (A).

TABLE 4

| Materials used. | Mixing ratio (kg) | Specific gravity. |
|---|---|---|
| Carrageenan | 1.2 | |
| Sucrose | 60.3 | |
| Water | 171.5 | |
| (Total) | 233.0 | 1.1100* |

*Calculated from equation (18).

Carrageenan and sucrose were placed in a 500 liter tank, in which water had been placed, with a jacket. The resulting mixture was warmed at 40° to 50° C. to be dissolved, and then was pasteurized at 85° C. for 10 minutes and cooled to 70° C. Then the isotonized mixture (B) was added thereto, and the resulting mixture was stirred at about 55° C. to give the compounded mixture. The compounded mixture was poured into 500 plastic transparent containers (100 ml each) and rapidly cooled to solidify. Juice sacs of a mandarin orange (Unshu-mikan) were homogeneously dispersed in the products. The products had the natural taste and flavor of the mandarin orange and a good texture in the mouth.

EXAMPLE 2

A sarcocarp-containing jelly in which the specific gravity of the compounded mixture was 1.090 was prepared from 73 kg of separated juice sacs (specific gravity: 1.070, sugar content: 16°Bx) of a grapefruit which had been preserved in a sucrose solution and starting materials as shown in Table 5 were used for the syrup.

When 27 kg of the syrup was used, the specific gravity ($\rho_{s1}$) of the syrup was calculated from equation (15) by substituting $W_{s1}$, $W_{f1}$, $\rho$, $\rho_{f1}$ and $P_{of1}$ for 27, 73, 1.090, 10.70 and 16, respectively. Thus the syrup having a specific gravity of 1.1411 was to be prepared.

The specific gravity of the syrup was adjusted by changing the amounts of sucrose and water. The starting materials, excepting the sarcocarp as shown in Table 5, were placed in a 200 liter tank with a jacket, and the resulting mixture was warmed at 40° to 50° C. to be dissolved and to prepare the syrup. Then the sarcocarp was added to the syrup and heated at 75° C. for 15 minutes to be pasteurized and was then cooled to 20° C. to prepare an isotonized mixture (B). The specific gravity of the liquid portion of the isotonized mixture (B) ($\rho$=1.0834) was calculated from equation (16) by substituting $\rho$, $\rho_{f1}$ and $P_{of1}$ for 1.090, 1.070 and 16, respectively.

The amount ($W_{s2}$) of the liquid portion of the isotonized mixture (B) was calculated from the equation (17) as follows.

$$W_{s2} = \frac{27}{1.1411}(1.090 - 1.070 + 4.4 \times 10^{-3} \times 16 + 0.993)$$

$$= 27 \times \frac{1.0834}{1.1411} = 25.63$$

The results are shown in Table 5.

TABLE 5

| Materials used. | Mixture (B) | | Isotonized mixture (B) | |
|---|---|---|---|---|
| | Amounts. (kg) | Specific gravity. | Amounts. (kg) | Specific gravity. |
| (Sarcocarp) | | | | 1.0900 |
| Juice sacs of grapefruit preserved in sucrose solution. | 73 | 1.070 | , | |
| (Syrup) | | 1.1411[1] | 25.63[3] | 1.0834[2] |
| 5-fold juice of grapefruit | 10.0 | | | |
| Sucrose | 1.5 | | | |
| Citric acid | 2.0 | | | |
| Sodium citrate | 1.0 | | | |
| Coloring agent | 0.1 | | | |
| Flavoring material | 0.5 | | | |
| Water | 11.9 | | | |
| Grand Total | 100 | | | |

[1] Calculated from equation (15).
[2] Calculated from equation (16).
[3] Calculated from equation (17).

Then solution (A) was prepared from materials as shown in Table 6. When the amount of the isotonized mixture (B) to be mixed with solution (A) was 16.7%, according to the usual proportions of a sarcocarp-containing jelly, the amount ($W_A$) of solution (A) was calculated to be about 500 kg (=83.3/0.167). The specific gravity ($\rho_A$=1.0903) of solution (A) was calculated from the equation (18) as follows.

$$1.09 = \frac{25.63 + 500}{\frac{25.63}{1.0904} + \frac{500}{\rho_A}}$$

Since the specific gravity of solution (A) was mainly adjusted by sucrose content, specified amounts of the materials as shown in Table 6 were used to prepare solution (A).

TABLE 6

| Materials used. | Mixing ratio (kg) | Specific gravity. |
|---|---|---|
| Carrageenan | 2.25 | |
| Sucrose | 108.45 | |
| Water | 389.30 | |
| (Total) | 500 | 1.0903* |

*Calculated from equation (18).

Carrageenan and sucrose were placed in a 1,000 liter tank, in which water had been placed, with a jacket. The resulting mixture was warmed at 40° to 50° C. to be dissolved, and was pasteurized at 130° C. for 2 seconds and then cooled to 65° C. by a plate type heat exchanger to prepare solution (A).

Then the isotonized mixture (B) was placed into the 1,000 liter tank with stirring and was mixed with solution (A) at about 55° C. to give a compounded mixture. The compounded mixture was poured into 500 plastic transparent containers (100 ml each) and was rapidly cooled to be solidified. The products had, like those in Example 1, a good texture in the mouth and homogeneously dispersed grapefruit juice sacs.

EXAMPLE 3

A sarcocarp-containing jelly in which the specific gravity of the compounded mixture was 1.100 was prepared by using a yellow peach which had been cut 5 mm$^3$ in size (specific gravity: 1.085, sugar content of a sucrose solution: 20°Bx) and preserved in the sucrose solution as a sarcocarp and the materials as shown in Table 7.

When 50 kg of the syrup was used, a specific gravity ($\rho_{s1}$) of the syrup was calculated from equation (15) by substituting $W_{s1}$, $W_{f1}$, $\rho$, $\rho_{f1}$ and $P_{of1}$ for 50, 50, 1.100, 1.085 and 20, respectively. Thus the syrup having a specific gravity of 1.111 was to be prepared.

The starting materials, excepting the sarcocarp as shown in Table 7, were placed in a 200 liter tank with a jacket, and the resulting mixture was warmed at 40° to 50° C. to be dissolved and to prepare the syrup. Then the sarcocarp was added to the syrup and heated at 90° C. for 5 minutes to be pasteurized and then cooled to 20° C. to prepare an isotonized mixture (B). The specific gravity of the liquid portion of the isotonized mixture (B) ($\rho_{s2}=1.096$) was calculated from equation (16) by substituting $\rho$, $\rho_{f1}$ and $P_{of1}$ for 1.100, 1.085 and 20, respectively.

The amount ($W_{s2}$) of the liquid portion of the isotonized mixture (B) was calculated from equation (17) as follows.

$$W_{s2} = \frac{50}{1.111}(1.100 - 1.085 + 4.4 \times 10^{-3} \times 20 + 0.993)$$

$$= 50 \times \frac{1.096}{1.111} = 49.32$$

The results are shown in Table 7.

TABLE 7

| | Mixture (B) | | Isotonized mixture (B) | |
|---|---|---|---|---|
| Materials used. | Amounts. (kg) | Specific gravity. | Amounts. (kg) | Specific gravity. |
| (Sarcocarp) | | | | 1.100 |
| Yellow peach preserve | 50 | 1.085 | | |
| (Syrup) | | 1.111[1] | 49.32[3] | 1.096[2] |
| Peach puree | 20 | | | |
| Sucrose | 10.6 | | | |
| Citric acid | 1.0 | | | |
| Sodium citrate | 0.4 | | | |
| Coloring agent | 0.1 | | | |
| Flavoring material | 0.4 | | | |
| Water | 17.5 | | | |
| (Grand Total) | 100 | | | |

[1]Calculated from equation (15).
[2]Calculated from equation (16).
[3]Calculated from equation (17).

Then solution (A) was prepared from the materials of Table 8. When the amount of the isotonized mixture (B) to be mixed with the solution (A) was 40%, the amount ($W_A$) of solution (A) was calculated to be 150 kg (=60/0.4).

The specific gravity ($\rho_A=1.101$) of solution (A) was calculated from equation (18) as follows.

$$1.100 = \frac{49.32 + 150}{\frac{49.32}{1.096} + \frac{150}{\rho_A}}$$

Since the specific gravity of solution (A) was mainly adjusted by sucrose content, specified amounts of the materials as shown in Table 8 were used to prepare solution (A).

TABLE 8

| Materials used. | Mixing Ratio (kg) | Specific gravity. |
|---|---|---|
| Carrageenan | 2.55 | |
| Sucrose | 33.7 | |
| Water | 113.75 | |
| (Total) | 150 | 1.101* |

*Calculated from equation (18).

Carrageenan and sucrose were placed in a 500 liter tank, in which water had been placed, with a jacket. The resulting mixture was warmed at 40° to 50° C. to be dissolved, and was pasteurized at 90° C. for 5 minutes, and then cooled to 80° C. to prepare a solution (A).

Then the isotonized mixture (B) was placed in the 500 liter tank with stirring, and mixed with solution (A) at about 55° C. to prepare a compounded mixture. The compounded mixture was poured into 500 plastic transparent containers (100 ml each) and was rapidly cooled to be solidified. The products had an excellent texture in the mouth, and excellent taste and flavor and had homogeneously dispersed peach in fine cubic pieces.

Having now fully described this invention, it will be apparent to one of ordinary skill in the art that many changes and modifications can be made without departing from the spirit or scope of the invention as set forth herein.

What is claimed as new and desired to be secured by Letters Patent of the United States is:

1. A process for preparing a sarcocarp-containing jelly having homogeneously dispersed sarcocarps which comprises the step of:
   (a) dissolving starting materials for the manufacture of a jelly, other than gelling agents and sarcocarps, in water, to prepare a syrup;
   (b) preparing an isotonized mixture (B) comprising isotonized sarcocarps and the syrup, by adding sarcocarps to the syrup to form a mixture (B) and heating the mixture (B) to pasteurize said mixture;
   (c) preparing a solution (A), with a specific gravity and in an amount necessary for the preparation of a liquid portion having a specific gravity substantially equal to that of the isotonized sarcocarps contained in the isotonized mixture (B), of a compounded mixture prepared by mixing the solution (A) with the isotonized mixture (B), wherein said solution (A) is prepared by heating an aqueous solution of starting materials containing gelling agents, in the absence of acidic constituents or the sarcocarps, and, wherein the aqueous solution of starting materials has a substantially neutral pH for pasteurization; and
   (d) mixing solution (A) with the isotonized mixture (B) at a temperature of not lower than the gelling temperature of the compounded mixture of the solution (A) and the isotonized mixture (B), and rapidly cooling the compounded mixture to solidify said mixture before reisotonizing the sarcocarps contained therein to the osmotic pressure of the liquid portion of the compounded mixture.

2. The process according to claim 1, wherein the weight of the syrup and the specific gravity of the solution (A) are calculated from the following equations (I) and (II), respectively:

$$W_{s1} = \frac{W_{fl}\left(\dfrac{\rho}{\rho_{fl}} - 1\right)}{1 - \dfrac{1}{\rho_{s1}}(\rho - \rho_{fl} + 4.4 \times 10^{-3}P_{ofl} - 3.2 \times 10^{-4}t + 0.9994)} \quad (I)$$

wherein $W_{s1}$ is the weight (in kilogram) of the syrup, $W_{fl}$ is the weight (in kilogram) of the sarcocarps, $\rho$ is the specific gravity of the compounded mixture at $t°$ C. (=specific gravity of the isotonized sarcocarps at $t°$ C.), $\rho_{fl}$ is the specific gravity of the sarcocarps at $t°$ C., $\rho_{s1}$ is the specific gravity of the syrup at $t°$ C., $P_{ofl}$ is the sugar content (in Brix) of the sarcocarps, and t is the temperature of the mixture (B) obtained by mixing the syrup with the sarcocarps before heating; and $$\rho = \frac{W_{s2} + W_A}{\dfrac{W_{s2}}{\rho_{s2}} + \dfrac{W_A}{\rho_A}} \quad (II)$$

wherein $W_{s2}$ is the weight (in kilogram) of the liquid portion of the mixture (B) calculated from equation (IV), $\rho_{s2}$ is the specific gravity of the liquid portion of the mixture (B) at $t°$ C. (=specific gravity of the isotonized sacocarps at $t°$ C.) calculated from equation (III), $W_A$ is the weight (in kilogram) of the solution (A) and $\rho_A$ is the specific gravity of the solution (A) at $t°$ C.; and $$\rho_{s2} = \rho - \rho_{fl} + 4.4 \times 10^{-3}P_{ofl} - 3.2 \times 10^{-4}t + 0.9994 \quad (III)$$

$$W_{s2} = \frac{W_{s1}}{\rho_{s1}}(\rho - \rho_{fl} + 4.4 \times 10^{-3}P_{ofl} - 3.2 \times 10^{-4}t + 0.994) \quad (IV)$$

wherein the signs of the equations (III) and (IV) are identical with those defined in the equation (I).

3. The process according to claim 1, wherein the solution (A) comprises gelling agents, sugars and water, and the mixture (B) comprises acidic constituents, sarcocarps, sugars, flavoring materials, coloring agents and water.

4. The process according to claim 3, wherein the solution (A) further comprises thickening agents.

5. The process according to claim 3, wherein the acidic constituents are at least one substance selected from the group consisting of fruit juices and edible organic acids.

6. The process according to claim 3, wherein the gelling agents are at least one substance selected from the group consisting of carrageenan, gelatin, agar agar and pectin.

7. The process according to claim 1, wherein the heating for pasteurization is carried out in the range of about 75° C. for 15 minutes to about 140° C. for 2 seconds.

8. The process according to claim 1, wherein the mixing of solution (A) and the isotonized mixture (B) is carried out at a temperature of about 5° to 10° C. higher than the gelation temperature of the compounded mixture.

9. The process according to claim 1, wherein the sugar contents of the solution (A), the syrup and the sarcocarps are within a range of about 10° to 30°Brix.

10. The process according to claim 1, wherein the compounded mixture, at a temperature of not lower than that of the gelation temperature, is poured into a container, hermetically sealed and cooled to be solidified.

11. The process according to claim 3, wherein the sarcocarps are separated juice sacs of a mandarin orange preserved in a sucrose solution.

12. The process according to claim 3, wherein the sarcocarps are separated juice sacs of a grapefruit preserved in a sucrose solution.

13. The process according to claim 3, wherein the sarcocarps are yellow peach portions in a sucrose solution.

14. A sarcocarp-containing jelly having homogeneously dispersed sarcocarps which is produced by the process of:
 (a) dissolving starting materials for the manufacture of a jelly, other than gelling agents and sarcocarps, in water to prepare a syrup;
 (b) preparing an isotonized mixture (B) comprising isotonized sarcocarps and the syrup, by adding sarcocarps to the syrup to form a mixture (B) and heating the mixture (B) to pasteurize said mixture;
 (c) preparing a solution (A), with a specific gravity and in an amount necessary for the preparation of a liquid portion having a specific gravity substantially equal to that of the isotonized sarcocarps contained in the isotonized mixture (B), of a compounded mixture prepared by mixing the solution (A) with the isotonized mixture (B), wherein said solution (A) is prepared by heating an aqueous solution of starting materials containing gelling agents but not acidic constituents or the sarcocarps, and wherein the aqueous solution of starting materials has a substantially neutral pH for pasteurization; and
 (d) mxing the solution (A) with the isotonized mixture (B) at a temperature of not lower than the gelling temperature of the compounded mixture of the solution (A) and the isotonized mixture (B), and rapidly cooling the compounded mixture to solidify said mixture before reisotonizing the sarcocarps contained therein to the osmotic pressure of the liquid portion of the compounded mixture.

* * * * *